(12) United States Patent
Binnard

(10) Patent No.: US 12,303,975 B2
(45) Date of Patent: May 20, 2025

(54) ANALYZER SYSTEM FOR ALIGNING AND FOCUSING AN ENERGY BEAM IN A THREE-DIMENSIONAL PRINTER

(71) Applicant: Nikon Corporation, Tokyo (JP)

(72) Inventor: Michael Birk Binnard, Belmont, CA (US)

(73) Assignee: Nikon Corporation (JP)

( * ) Notice: Subject to any disclaimer, the term of this patent is extended or adjusted under 35 U.S.C. 154(b) by 77 days.

(21) Appl. No.: 17/893,901

(22) Filed: Aug. 23, 2022

(65) Prior Publication Data
US 2023/0081971 A1      Mar. 16, 2023

Related U.S. Application Data

(60) Provisional application No. 63/245,024, filed on Sep. 16, 2021.

(51) Int. Cl.
*B22F 10/36* (2021.01)
*B22F 12/37* (2021.01)
(Continued)

(52) U.S. Cl.
CPC .............. *B22F 10/36* (2021.01); *B22F 12/37* (2021.01); *B22F 12/41* (2021.01); *B22F 12/90* (2021.01);
(Continued)

(58) Field of Classification Search
CPC .......... B22F 10/31; B22F 12/37; B22F 10/36; B22F 12/137; B22F 12/41; B22F 12/90; B33Y 10/00; B33Y 30/00
See application file for complete search history.

(56) References Cited

U.S. PATENT DOCUMENTS 10,286,484 B1 *   5/2019  McCarthy .......... B23K 26/0823
2015/0202687 A1    7/2015  Pialot et al.
(Continued)

FOREIGN PATENT DOCUMENTS

EP           3345764 A1    7/2018
JP        2015157420 A     9/2015
(Continued)

OTHER PUBLICATIONS

International Search Report and Written Opinion issued by the European Patent Office International Searching Authority, in PCT Application Serial No. PCT/US2020/040391, on Feb. 9, 2021. (Related matter).

*Primary Examiner* — Jamel M Nelson
(74) *Attorney, Agent, or Firm* — ROEDER & BRODER LLP; Steven G. Roeder

(57) ABSTRACT

A processing machine (10) for building an object (11) from a material (12) includes a build platform (16), a platform mover assembly (20), a material supply (22), an irradiation device (26), and an analyzer system (30). The platform mover assembly (20) moves the build platform (16) about a platform movement axis (48X) and along the platform movement axis (48X). The material supply (22) supplies material (12) to build the object (11) on the build platform (16). The irradiation device (26) irradiates at least a portion of the material (12) with an energy beam (26A) to form the object (11) from the material (12) on the build platform (16). The analyzer system (30) is configured to monitor the energy beam (26A). The analyzer system (30) includes an alignment component (36) that rotates concurrently with the build platform (16) about the platform movement axis (48X), but that is inhibited from moving concurrently with the build platform (16) along the platform movement axis (48X).

34 Claims, 4 Drawing Sheets

(51) Int. Cl.
  *B22F 12/41*  (2021.01)
  *B22F 12/90*  (2021.01)
  *B33Y 10/00*  (2015.01)
  *B33Y 30/00*  (2015.01)

(52) U.S. Cl.
  CPC ............... *B33Y 10/00* (2014.12); *B33Y 30/00* (2014.12); *B22F 2203/00* (2013.01)

(56) References Cited

U.S. PATENT DOCUMENTS

2017/0348902 A1    12/2017   Ohara et al.
2018/0326660 A1    11/2018   Gifford et al.
2021/0154929 A1*   5/2021    Long .................... B29C 64/209

FOREIGN PATENT DOCUMENTS

| JP | 2017145476 A | 8/2017 |
| WO | WO2018011240 A1 | 6/2018 |
| WO | WO2019102016 A1 | 5/2019 |
| WO | WO2021003202 A2 | 1/2021 |

\* cited by examiner

ANALYZER SYSTEM FOR ALIGNING AND FOCUSING AN ENERGY BEAM IN A THREE-DIMENSIONAL PRINTER

RELATED APPLICATION

This application claims priority on U.S. Provisional Application No. 63/245,024 filed on Sep. 16, 2021, and entitled "ANALYZER SYSTEM FOR ALIGNING AND FOCUSING AN ENERGY BEAM IN A THREE-DIMENSIONAL PRINTER". As far as permitted the contents of U.S. Provisional Application No. 63/245,024 are incorporated in their entirety herein by reference.

BACKGROUND

Certain three-dimensional printing systems use an energy beam to manufacture a part on a rotating build platform (also sometimes referred to as a "turntable"). During the manufacturing process, the energy beam irradiates material to manufacture the part. In order to properly manufacture the part, the energy beam needs to be accurately focused and/or aligned on a top layer of the material as the energy beam irradiates the material. Unfortunately, during the manufacturing process, the energy beam can become out of focus and/or misaligned. Accordingly, there is a need for an analyzer system that determines the focal plane of the energy beam for proper alignment and focusing of the energy beam.

SUMMARY

The present embodiment is directed to a processing machine for building an object from a material. In various embodiments, the processing machine includes a build platform, a platform mover assembly, a material supply, an irradiation device, and an analyzer system. The platform mover assembly is configured to move the build platform about a platform movement axis and along the platform movement axis. The material supply supplies material to build the object on the build platform. The irradiation device irradiates at least a portion of the material with an energy beam to form the object from the material on the build platform. The analyzer system is configured to monitor the energy beam. The analyzer system includes an alignment component that rotates concurrently with the build platform about the platform movement axis, but that is inhibited from moving concurrently with the build platform along the platform movement axis.

With this design, the processing machine, e.g., a rotary bed three-dimensional printer, is able to monitor the focus and alignment of the energy beam from the irradiation device to more accurately and precisely provide the object that is properly built to desired specifications.

In some embodiments, the processing machine further includes a platform support structure that supports the build platform. In such embodiments, the platform mover assembly is coupled to the platform support structure and moves the platform support structure about the platform movement axis and along the platform movement axis.

In certain embodiments, the processing machine further includes a measurement device that measures the object as it is being built on the build platform.

In some embodiments, the processing machine further includes a control system that is configured to control operation of the platform mover assembly, the material supply, the irradiation device, and the analyzer system.

In certain embodiments, the processing machine further includes a build chamber that defines a build space; the build platform being enclosed within the build chamber.

In some embodiments, the alignment component is supported by a support bearing that is coupled to the build chamber to inhibit the alignment component from moving along the platform movement axis with the build platform.

In certain embodiments, the analyzer system further includes a support frame that is coupled to the build chamber. In such embodiments, the support bearing can be attached to the support frame.

In some embodiments, the analyzer system further includes an alignment plate; with the alignment component being formed onto the alignment plate.

In certain embodiments, the analyzer system further includes a plate support structure that supports the alignment plate.

In some embodiments, the processing machine further includes a platform support structure that supports the build platform. In such embodiments, the platform mover assembly is coupled to the platform support structure and moves the platform support structure about the platform movement axis and along the platform movement axis. Additionally, the platform support structure is configured to be coupled to the plate support structure so that the plate support structure rotates concurrently with the platform support structure about the platform movement axis, and the platform support structure moves along the platform movement axis relative to the plate support structure.

In certain embodiments, at least a portion of the platform support structure is configured to substantially encircle at least a portion of the plate support structure. In other embodiments, at least a portion of the plate support structure is configured to substantially encircle at least a portion of the platform support structure.

In some embodiments, the analyzer system further includes a coupling system that couples the platform support structure and the plate support structure. In certain such embodiments, the coupling system includes a first coupling feature that is formed into the platform support structure, and a second coupling feature that is formed into the plate support structure. The first coupling feature is configured to be coupled to the second coupling feature so that the platform support structure and the plate support structure rotate together about the platform movement axis.

In certain embodiments, the first coupling feature is a first non-circular feature that is formed onto a surface of the platform support structure; and the second coupling feature is a second non-circular feature that corresponds with the first non-circular feature. For example, in one such embodiment, the first coupling feature includes a key and the second coupling feature includes a keyway slot. Alternatively, in another such embodiment, each of the first coupling feature and the second coupling feature includes a rectangular-shaped surface. Still alternatively, in still another such embodiment, each of the first coupling feature and the second coupling feature includes a spline-shaped surface.

In some embodiments, the coupling between the platform support structure and the plate support structure allows relative movement between the platform structure and the plate support structure along a length of the support structures.

In another implementation, the processing machine includes: a build platform; a platform support structure that supports the build platform; a platform mover assembly that is configured to move the platform support structure about a platform movement axis and along the platform movement axis; a material supply that supplies material to build the object on the build platform; an irradiation device which irradiates at least a portion of the material with an energy beam to form the object from the material on the build platform; and an analyzer system that is configured to monitor the energy beam, the analyzer system including a plate support structure that is configured to be coupled to the platform support structure such that the plate support structure is constrained to rotate concurrently with the platform support structure about the platform movement axis, but so as to allow relative movement between the platform structure and the plate support structure along the platform movement axis.

In still another implementation, a method for building an object from a material includes: providing a build platform; moving the build platform about a platform movement axis with a platform mover assembly; moving the build platform along the platform movement axis with the platform mover assembly; supplying material to build the object on the build platform with a material supply; irradiating at least a portion of the material with an energy beam to form the object from the material on the build platform; and monitoring the energy beam with an analyzer system, the analyzer system including an alignment component that rotates concurrently with the build platform about the platform movement axis, but that is inhibited from moving concurrently with the build platform along the platform movement axis.

In yet another implementation, a method for building an object from a material includes: providing a build platform; supporting the build platform with a platform support structure; moving the build platform about a platform movement axis with a platform mover assembly; moving the build platform along the platform movement axis with the platform mover assembly; supplying material to build the object on the build platform with a material supply; irradiating at least a portion of the material with an energy beam to form the object from the material on the build platform; and monitoring the energy beam with an analyzer system, the analyzer system including a plate support structure that is configured to be coupled to the platform support structure such that the plate support structure is constrained to rotate concurrently with the platform support structure about the platform movement axis, but so as to allow relative movement between the platform structure and the plate support structure along the platform movement axis.

BRIEF DESCRIPTION OF THE DRAWINGS

The novel features of this embodiment, as well as the embodiment itself, both as to its structure and its operation, will be best understood from the accompanying drawings, taken in conjunction with the accompanying description, in which similar reference characters refer to similar parts, and in which.

DESCRIPTION

Implementations of the present invention are described herein in the context of a processing machine, e.g., a rotary bed three-dimensional printer, that is uniquely configured to monitor focus and alignment of an electron beam irradiation device of the processing machine to more accurately and precisely provide a part that is properly built to desired specifications. More particularly, with various implementations of the present invention, as described in detail herein, the problem of providing an alignment component, such as a fiducial mark, alignment mark or other component of the processing machine, at the focal plane of the processing machine is solved by incorporating a bearing mechanism that supports the alignment component so it rotates with the rotary build platform about a platform movement axis, but allows relative movement between the alignment component and the rotary build platform along the platform movement axis so that the alignment component remains substantially at the focal plane as the rotary build platform moves along the platform movement axis as successive layers of material are melted to form the built part.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
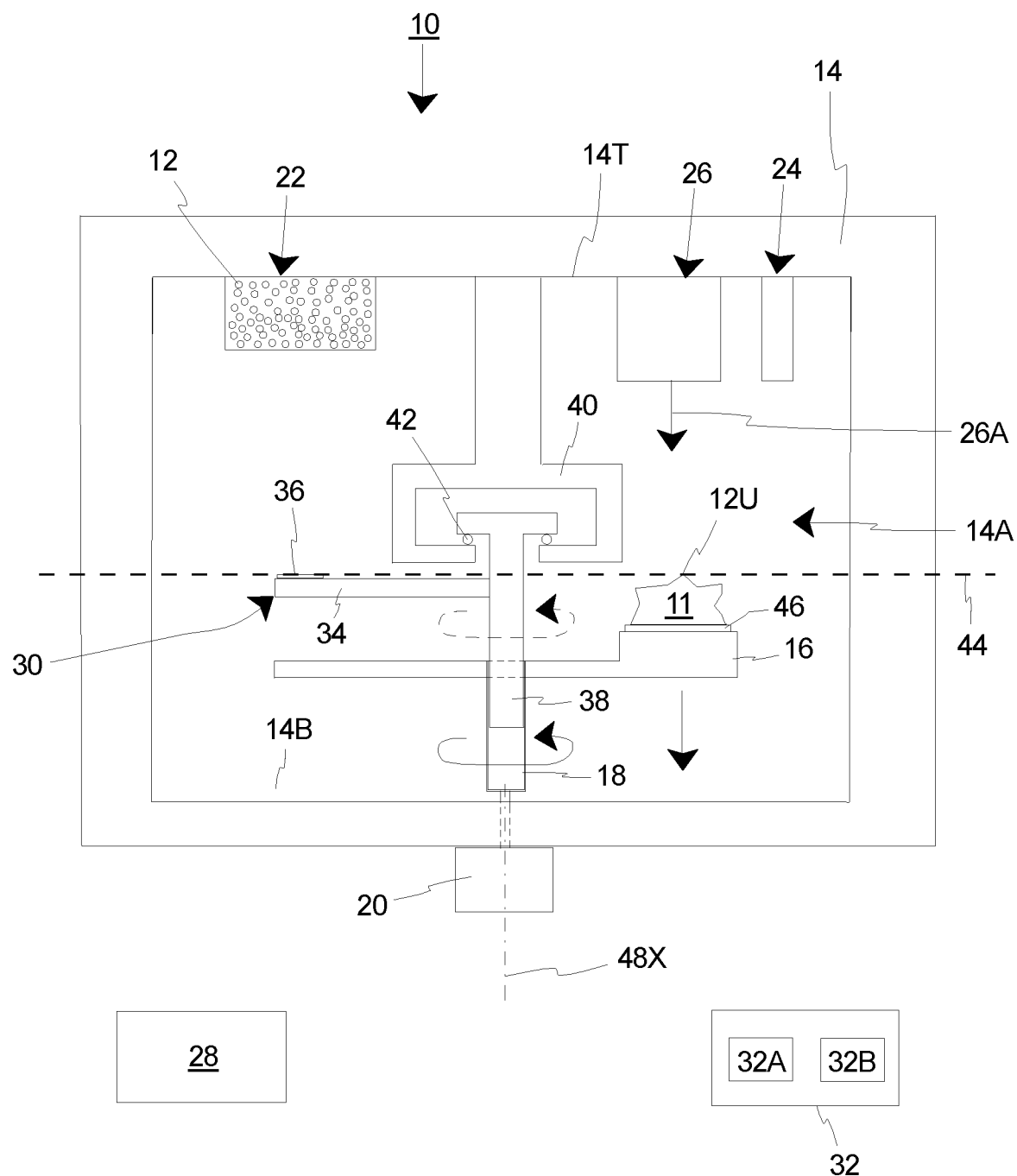
FIG. 1 is a simplified cut-away view of a processing machine having features of present implementations, and an object that is being formed using the processing machine.

FIG. 1 is a simplified side cut-away view of an implementation of a processing machine 10 that is used to manufacture one or more three-dimensional objects 11. As provided herein, the processing machine 10 may be an additive manufacturing system such as a three-dimensional printer in which a material 12 (illustrated as small circles) is joined, melted, solidified, and/or fused together to manufacture one or more three-dimensional object(s) 11.

The type of three-dimensional object(s) 11 manufactured with the processing machine 10 may be almost any shape or geometry. As a non-exclusive example, the three-dimensional object 11 may be a metal part, or another type of object, for example, a resin (plastic) part or a ceramic part, etc. The three-dimensional object 11 may also be referred to as a "part". The object 11 can be referred to as a "partially built object" while the material is being added, or as a "built object" when the object is completely formed. Further, one or more built objects 11 can be referred to as a "first built object", "second built object", "third built object", "fourth built object", or "fifth built object". Still further, sometimes the object 11 includes other portions than a designed/desired object. For example, the object 11 can include supports which support a part of the object, or sintered metal powder which is not a part of the object but which covers the designed/desired object 11.

The type of material 12 joined and/or fused together may be varied to suit the desired properties of the object(s) 11. As a non-exclusive example, the material 12 may include powder grains for metal three-dimensional printing. In alternative implementations, the material 12 may be metal powder, non-metal powder, a plastic, polymer, glass, ceramic powder, or any other material known to people skilled in the art. The material 12 may also be referred to as "powder" in certain implementations. Alternatively, for example, the processing can be a wire feed system in which the material is a wire that is melted to form the object 11.

In certain non-exclusive implementations, the processing machine 10 includes (i) a build chamber 14 that defines a build space 14A; (ii) a build platform 16 that supports the object 11; (iii) a platform support structure 18 that supports the build platform 16; (iv) a platform mover assembly 20 for selectively moving the build platform 16 and/or the platform support structure 18 as desired; (v) a material supply 22 (illustrated as a box) that supplies the powder 12; (vi) a measurement device 24 (illustrated as a box); (vii) an irradiation device 26 (illustrated as a box) that directs an energy beam 26A (illustrated with an arrow) to melt and/or fuse the powder 12; (viii) a chamber environmental controller 28; (ix) an analyzer system 30; and (x) a control system 32 that cooperate to make each three-dimensional object 11. Additionally, in various implementations, the analyzer system 30 includes an alignment plate 34, an alignment component 36 that is formed onto and/or coupled to the alignment plate 34, a plate support structure 38 that supports the alignment plate 34, and a support frame 40 that supports the plate support structure 38 relative to the build chamber 14, e.g., relative to a chamber top 14T of the build chamber 14, with a support bearing 42. The design of each of these components of the processing machine 10 may be varied pursuant to the teachings provided herein. Moreover, it should be noted that the positions of the components of the processing machine 10 may be different than that illustrated in FIG. 1. Further, it should be noted that the processing machine 10 may include more components or fewer components than illustrated in FIG. 1.

As an overview, in certain embodiments, the analyzer system 30 is uniquely configured to support the alignment component 36, such as fiducial marks, alignment marks, a metrology target, or other suitable component of the processing machine, at a focal plane 44 (illustrated with a dashed line) of the energy beam 26A from the irradiation device 26 that is substantially coplanar with a top layer 12U of material 12 being used to build the object 11. By having the energy beam 26A from the irradiation device 26 focused on the top layer 12U of material 12 that is being used to build the object 11, with such focus being confirmed and/or corrected based on feedback generated from the energy beam 26A scanning across the alignment component 36, the processing machine 10 is best able to accurately and precisely direct the energy beam 26A to build the object 11 in accordance with desired specifications.

Additionally, as shown, at least a portion of the platform support structure 18 is configured to substantially surround and/or encircle at least a portion of the plate support structure 38. Alternatively, in other embodiments, at least a portion of the plate support structure 38 can be configured to substantially surround and/or encircle at least a portion of the platform support structure 18.

In some embodiments, with the use of the support frame 40 and the support bearing 42 in supporting the plate support structure 38 relative to the build chamber 14, and with a non-circular coupling between the plate support structure 38, e.g., an outer surface (or plurality of surfaces) of the plate support structure 38, and the platform support structure 18, e.g., an inner surface (or plurality of surfaces) of the platform support structure 18, the alignment component 36 and the alignment plate 34 are configured to rotate with the build platform 16 about a platform movement axis 48X, and thus the object 11, while the alignment component 36 is maintained at the focal plane 44 of the energy beam 26A of the irradiation device 26, and are inhibited from moving along the platform movement axis 48X even as the build platform 16 is moving along the platform movement axis 48X during the build process.

The build chamber 14 defines the build space 14A in which the objects 11 are formed. In one, non-exclusive implementation, the build chamber 14 is generally rigid box-shaped, and forms a generally rectangular-shaped, sealed, build space 14A. In FIG. 1, the build chamber 14 encloses the build platform 16, the material supply 22, the measurement device 24, the irradiation device 26 and the analyzer system 30, in addition to the object 11 that is being built. In this simplified example, the build platform 16 is mechanically coupled to the platform mover assembly 20 at or near a chamber bottom 14B, and the material supply 22, the measurement device 24, the irradiation device 26 and the analyzer system 30 are coupled to the build chamber 14 at or near the chamber top 14T of the build chamber 14. Alternatively, for example, (i) the build chamber 14 can have a different configuration (e.g., cylindrical-shaped, trapezoidal-shaped, a sector of an annulus-shaped, etc.); and/or (ii) the build platform 16, the material supply 22, the measurement device 24, the irradiation device 26 and the analyzer system 30 can be positioned at different locations within and/or relative to the build chamber 14.

In some embodiments, the build chamber 14 defines a build space 14A that can sequentially be used for pre-processing, forming, and post-processing of one or more objects 11. As non-exclusive examples, (i) pre-processing steps can include preparing the build platform 16, build chamber 14, material supply 22, and other components for the subsequent building process; (ii) building steps can include depositing powder 12 on the build platform 16 and fusing the powder 12 together; and (iii) post-processing steps can include gradually cooling the built object 11 and performing some method of extracting the object 11 from the build chamber 14. In certain alternative embodiments, one or more of the post-processing steps can occur outside the build chamber 14, i.e. after the object 11 has been removed from the build chamber 14.

The build platform 16 (directly or indirectly) supports the powder 12 while each object 11 is being formed. The build platform 16 can include a build base 16A and one or more build areas 16B. In FIG. 1, the build platform 16 includes single build area 16B that is fixed to the build base 16A. However, the build platform 16 can designed to include multiple, spaced apart build areas 16B. In certain implementations, one or more of the build areas 16B can be designed to rotate relative to the build base 16A. In certain implementations, each object 11 is built directly in/on the build area(s) 16B. Alternatively, one or more objects 11 can be built onto a build frame 46 which is supported by and/or selectively coupled to the build area 16B. In FIG. 1, a single object 11 is built on the build frame 46. Alternatively, two or more objects 11 can be built on the build frame 46. With this design, the build frame 46 supports the powder 12 while each object 11 is being formed. For example, the build frame 46 can be made of the same material as the powder 12 or another suitable material. In certain implementations, the build frame 46 includes one or more frame features (not shown) that allow for the build frame 46 to be selectively coupled to the build platform 16. In one implementation, the object 11 is fused (e.g., welded) to the build frame 46 during the three-dimensional printing process. Alternatively, for example, the object 11 is not fused to the build frame 46 during the three-dimensional printing process.

In FIG. 1, the build frame 46 is generally flat-shaped, e.g., flat disk-shaped. Alternatively, for example, the build frame 46 can include side walls (not shown) that extend upward from a perimeter of the build frame 46 to support the powder 12, or other features.

The platform support structure 18 supports the build platform 16. In the embodiment of FIG. 1, the platform support structure 18 extends in a generally downward vertical direction from the build platform 16 and is coupled to the platform mover assembly 20 at or near the chamber bottom 14B of the build chamber 14. In one embodiment, the platform support structure 18 is generally cylindrical tube-shaped. Alternatively, the platform support structure 18 can have another suitable shape, such as a rectangular tube shape, a triangular tube shape, or another suitable shape, one or more of which are specifically illustrated and described herein.

Additionally, in certain embodiments, as described in greater detail herein below, the platform support structure 18 is configured to be coupled to and selectively receive a portion of the plate support structure 38. In various embodiments, the coupling between the platform support structure 18 and the plate support structure 38 allows the support structures 18, 38 to rotate together, while still allowing relative movement between the support structures 18, 38.

The platform mover assembly 20 is coupled to the platform support structure 18 and is configured to move the platform support structure 18, and thus the build platform 16, as desired. The platform mover assembly 20 can include one or more actuators. More particularly, the platform mover assembly 20 can include a rotational actuator that is configured to move the platform support structure 18, and thus the build platform 16, in a rotational direction (clockwise and/or counter-clockwise) about the platform movement axis 48X during the build process. With such design, the material supply 22, the measurement device 24, and the irradiation device 26 can each be positioned substantially directly over the build frame 46 at particular times during the build process as the object 11 is being built on the build platform 16. Additionally, the platform mover assembly 20 can further include a linear actuator that is configured to move the platform support structure 18, and thus the build platform 16, along the platform movement axis 48X, e.g., in a generally downward vertical direction, as successive layers of powder 12 are added onto the build platform 16 as the object 11 is being built onto the build platform 16. After the object 11 has been completely built and removed from the build platform 16, the platform mover assembly 20 can subsequently move the platform support structure 18, and thus the build platform 16, along the platform movement axis 48X, e.g., in a generally upward vertical direction, so that the build platform 16 is in a proper position so that another object 11 can be built onto the build platform 16. In one non-exclusive alternative embodiment, the platform mover assembly 20 can include a linear actuator that is configured to move the build platform along a movement axis that is substantially parallel to, but spaced apart from, the platform movement axis 48X.

As shown in FIG. 1, only a single object 11 is being formed at any given time on the build platform 16 and/or the build area 16B. Depending on the design of the build platform 16 the weight of the object 11 being built can cause an imbalance for the build platform 16. Thus, it is appreciated that the processing machine 10 can be modified in any suitable manner to monitor that the build platform 16 can be properly balanced as the object 11 is being built. For example, in one non-exclusive embodiment, the processing machine 10 can be configured to build more than a single object at any given time, e.g., a second object on a second build area in a direction substantially opposite to the object 11 about the platform support structure 18. In another non-exclusive embodiment, the processing machine 10 can include a movable/adjustable counterweight to help balance the build platform 16 as the object 11 is being built. Still alternatively, the build platform 16 can be balanced in another suitable manner as the object 11 is being built.

The material supply 22 supplies the material 12 that is used to build the objects 11 in the build chamber 14. The material supply 22 can deposit the material 12 onto the build platform 16, the build area 16B and/or the build frame 46 in a series of layers that are fused (melted) together with the energy beam 26A from the irradiation device 26. In one embodiment, the material supply 22 can include a powder hopper (not shown) that retains the material 12, and a material director (not shown) that directs the material 12 to the correct location. Alternatively, for example, the material supply 22 can be wire feed system which feeds the material 12.

The measurement device 24 inspects and monitors the melted (fused) layers and the deposition of the powder 12 while each object 11 is being built. As non-exclusive examples, the measurement device 24 may include one or more elements such as a uniform illumination device, fringe illumination device, cameras that function at one or more wavelengths, lens, interferometer, or photodetector, or a non-optical measurement device such as an ultrasonic, eddy current, or capacitive sensor.

The irradiation device 26 irradiates at least a portion of the material 12 with the energy beam 26A to form the object 11 from the material 12. Stated in another fashion, the irradiation device 26 selectively heats and melts the powder 12 with the energy beam 26A to form the object 11. In certain implementations, the irradiation device 26 sequentially exposes the powder 12 with the energy beam 26A to sequentially form each of the layers of the object 11.

In alternative non-exclusive implementations, the irradiation device 26 includes (i) an electron beam system that generates a charged particle beam, (ii) a laser beam system that generates a laser beam, (iii) an ion beam system that generates a charged particle beam, and/or (iv) an electric discharge arc. Certain irradiation devices 26 can be required to operate in a vacuum environment. Still alternatively, in other embodiments, the processing machine 10 can include more than one irradiation device 26, and each of the irradiation devices 26 can have a similar design (or be of a similar type) or one or more of the irradiation devices 26 can have different designs or be different types.

The chamber environmental controller 28 creates a controlled environment in the build chamber 14. In one implementation, the chamber environmental controller 28 creates a vacuum environment in the build chamber 14. Alternatively, the chamber environmental controller 28 can create a non-vacuum environment such as inert gas (e.g., helium gas, nitrogen gas or argon gas) environment in the build chamber 14. In another, non-exclusive example, the chamber environmental controller 28 can selectively and individually create a non-oxidizing atmosphere in the build chamber 14. The chamber environmental controller 28 may also control the temperature of the atmosphere or objects inside the build chamber 14.

It should be noted that in any of the implementations provided herein, the chamber environmental controller 28 can be varied to specifically treat the specific material 12 utilized and/or the part being built. As non-exclusive implementations, the chamber environmental controller 28 can be used to introduce heating, cooling, humidity or carbon content to simulate material treatments like tempering/quenching, carburizing, annealing, etc. The application rates of these environments, or simply cooling, can also be controlled by the chamber environmental controller 28 to benefit the properties of the material 12. For example, some materials 12 are best cooled quickly through low temperatures (quenching for hardening). As non-exclusive examples, the chamber environmental controller 28 can include one or more heaters, coolers, insulators, conductors, fluid pumps, vacuum pumps, gate valves, re-fill valves, and/or gas sources. As used herein, the term "vacuum" shall mean any space in which the pressure is significantly lower than atmospheric pressure.

The analyzer system 30 is configured monitor a focal plane 44 of the energy beam 26A from the irradiation device 26 so that the energy beam 26A is properly focused at the top layer 12U of material 12 that is being used to form the object 11 so that the object 11 can be formed to the desired specifications. More particularly, the alignment component 36 formed onto and/or coupled to the alignment plate 34 is supported relative to the platform movement axis 48X, e.g., in the vertical direction, such that the alignment component 36 is maintained at the focal plane 44 of the energy beam 26A from the irradiation device 26, which is substantially coplanar with the top layer 12U of material 12 being used to form the object 11. In various embodiments, the energy beam 26A from the irradiation device 26 is configured to scan across the alignment component 36, as the alignment plate 34 rotates with the build platform 16. Backscattered electrons, photons, or ions from the energy beam 26A scanning across the alignment component 36 can be collected and analyzed by a detector 50 (illustrated with a box) that is incorporated into the analyzer system 30 to determine if the energy beam 26A has drifted, whether there has been any thermal distortion, or if any other conditions have adversely impacted the desired focus and/or alignment of the energy beam 26A. Based on such feedback, the irradiation device 26 and/or the energy beam 26A can be adjusted so that the energy beam 26A is focused and/or aligned as necessary so that the object 11 can be formed to the desired specifications. Alternatively, the analyzer system 30 can function in another suitable manner to determine the focal plane 44 and the position of the energy beam 26A The alignment component 36 can have any suitable design for purposes of providing the necessary feedback to monitor the focus of the energy beam 26A. For example, in certain non-exclusive embodiments, the alignment component 36 can be fiducial marks that are formed from parallel lines of one material being positioned on another material of a different atomic weight to provide differing scatter patterns for electrons from the energy beam 26A that can be collected and analyzed by the detector 50. For embodiments where the energy beam 26A is a laser beam, the alignment component 36 can be fiducial marks formed from materials of different reflectivity. Alternatively, the alignment component 36 can be provided in another suitable manner.

In one embodiment, as shown, the alignment plate 34 with the alignment component 36 formed thereon and/or coupled thereto can extend away from the plate support structure 38 in a direction that is substantially opposite (180 degrees away in a horizontal plane) of the direction in which the build platform 16 and/or build frame 46 upon which the object 11 is built extends away from the platform support structure 18. With such design, the alignment component 36 can be better protected from potential damage due to heat, scattered electrons, or metal powder. Alternatively, the alignment plate 34 with the alignment component 36 formed thereon and/or coupled thereto can extend away from the plate support structure 38 in a direction that is closer to the direction in which the build platform 16, the build area 16B and/or build frame 46 upon which the object 11 is built extends away from the platform support structure 18. Still alternatively, the alignment component 36 can be formed onto and/or coupled to an alignment ring (not shown) that extends generally about the build platform 16 and/or the build frame 46 upon which the object 11 is being built. Yet alternatively, the alignment component 36 can be positioned in another suitable manner to monitor the focus of the energy beam 26A.

As illustrated in FIG. 1, the plate support structure 38, which supports the alignment plate 34 and thus the alignment component 36, is supported, e.g., in a vertical direction, from the support bearing 42 that is attached to the support frame 40. Additionally, as shown in this embodiment, the support frame 40 is coupled to the chamber top 14T (or ceiling) of the build chamber 14. Alternatively, the support frame 40 can be coupled to a different portion of the build chamber 14 and/or the support bearing 42 can be used to support the plate support structure 38 in another manner.

As shown, the support bearing 42 provides constraint for the plate support structure 38 along and/or parallel to the platform movement axis 48X, while still allowing the plate support structure 38 to freely rotate with the platform support structure 18 and the build platform 16 about the platform movement axis 48X. The support bearing 42 can have any suitable design for purposes of restricting motion of the plate support structure 38 in one direction, e.g., the vertical direction, while allowing motion of the plate support structure 38 in another direction, i.e. rotationally about the platform movement axis 48X with the build platform 16.

During use of the processing machine 10, the platform mover assembly 20 is configured to rotate the platform support structure 18, and thus the build platform 16, about the platform movement axis 48X. At the same time, as successive layers of material 12 are added onto the build platform 16, the platform mover assembly 20 is configured to move the platform support structure 18, and thus the build platform 16 and the build area 16B, along the platform movement axis 48X, e.g., vertically downward, as the object 11 is built up layer by layer.

In order to enable the plate support structure 38 to rotate with the platform support structure 18, the processing machine 10 further includes a coupling system 350 (illustrated in FIG. 3) that defines the coupling between the platform support structure 18 and the plate support structure 38. In particular, the platform support structure 18 can include a first coupling feature 352 (illustrated in FIG. 3) that is configured and/or positioned to couple a second coupling feature 354 (illustrated in FIG. 3) of the plate support structure 38. For example, in certain non-exclusive embodiments, the first coupling feature 352 can be provided in the form of a center (or inner surface) of the platform support structure 18 containing a spline, keyed hole, or other non-circular feature. The first coupling feature 352, e.g., the spline, keyed hole or other non-circular feature, couples with the second coupling feature 354 such as a matching non-circular shape for the plate support structure 38 (e.g., the outer surface of the plate support structure 38). Because the first coupling feature 352 is not circular, it creates a sliding bearing between the platform support structure 18 (and thus the build platform 16) and the plate support structure 38 (and thus the alignment plate 34 with the alignment component 36 formed thereon and/or coupled thereto), allowing them to move independently along the platform movement axis 48X while rotating together about the platform movement axis 48X.

It is appreciated that for vacuum environments, the sliding spline coupling could be replaced by a bellows or flexure that provides low stiffness along the platform movement axis 48X and high torsional stiffness about the platform movement axis 48X.

The control system 32 controls and directs power to the components of the processing machine 10, i.e. at least the platform mover assembly 20, the material supply 22, the measurement device 24, the irradiation device 26, the chamber environmental controller 28, and the analyzer system 30, to build the three-dimensional object 11 from the computer-aided design (CAD) model by successively adding powder 12 layer by layer. The control system 32 may include one or more processors 32A and one or more electronic storage devices 32B.

The control system 32 may include, for example, a CPU (Central Processing Unit), a GPU (Graphics Processing Unit), and a memory. The control system 32 functions as a device that controls the operation of the processing machine 10 by the CPU executing the computer program. This computer program is a computer program for causing the control system 32 (for example, a CPU) to perform an operation to be described later to be performed by the control system 32 (that is, to execute it). That is, this computer program is a computer program for making the control system 32 function so that the processing machine 10 will perform the operations provided herein. A computer program executed by the CPU may be recorded in a memory (that is, a recording medium) included in the control system 32, or an arbitrary storage medium built in the control system 32 or externally attachable to the control system 32, for example, a hard disk or a semiconductor memory. Alternatively, the CPU may download a computer program to be executed from a device external to the control system 32 via the network interface. Further, the control system 32 may not be disposed inside the processing machine 10, and may be arranged as a server or the like outside the processing machine 10, for example. In this case, the control system 32 and the processing machine 10 may be connected via a communication line such as a wired communications (cable communications), a wireless communications, or a network. In case of physically connecting with wired, it is possible to use serial connection or parallel connection of IEEE1394, RS-232x, RS-422, RS-423, RS-485, USB, etc. or 10BASE-T, 100BASE-TX, 1000BASE-T or the like via a network. Further, when connecting using radio, radio waves such as IEEE 802.1x, OFDM, or the like, radio waves such as Bluetooth (registered trademark), infrared rays, optical communication, and the like may be used. In this case, the control system 32 and the processing machine 10 may be configured to be able to transmit and receive various types of information via a communication line or a network. Further, the control system 32 may be capable of transmitting information such as commands and control parameters to the processing machine 10 via the communication line and the network. The processing machine 10 may include a receiving device (receiver) that receives information such as commands and control parameters from the control system 32 via the communication line or the network. As a recording medium for recording the computer program executed by the CPU, a CD-ROM, a CD-R, a CD-RW, a flexible disk, an MO, a DVD-ROM, a DVD-RAM, a DVD-R, a DVD+R, a DVD-RW, a magnetic medium such as a magnetic disk and a magnetic tape such as DVD+RW and Blu-ray (registered trademark), a semiconductor memory such as an optical disk, a magneto-optical disk, a USB memory, or the like, and a medium capable of storing other programs. In addition to the program stored in the recording medium and distributed, the program includes a form distributed by downloading through a network line such as the Internet. Further, the recording medium includes a device capable of recording a program, for example, a general-purpose or dedicated device mounted in a state in which the program can be executed in the form of software, firmware or the like. Furthermore, each processing and function included in the program may be executed by program software that can be executed by a computer, or processing of each part may be executed by hardware such as a predetermined gate array (FPGA, ASIC) or program software, and a partial hardware module that realizes a part of hardware elements may be implemented in a mixed form.

With the design of the processing machine 10 as described herein, the processing machine 10 can realize certain advantages over previous versions of the processing machine. For example, unlike prior designs for rotating-bed three-dimensional printers, the present invention allows supporting the alignment component 36, such as a fiducial mark, metrology target, or other component, at the focal plane 44 of the processing machine 10 (the three-dimensional printer) while allowing it to rotate with the object 11 and the build platform 16, which are moving vertically in certain embodiments. Previous embodiments required a vertical travel mechanism for the build piston on the rotating turntable. During design of the present invention, it was determined that placing any actuators or sensors on the turntable mechanism is difficult, as everything in this area will be exposed to sustained high temperatures, loose metal powder, vacuum, strong radiation (e.g., scattered electrons from the energy beam), and flying particles of molten metal that explode from the melt pool. To avoid these problems, it was decided to keep all of the actuators and sensors for the present invention outside the build chamber, such as a vacuum chamber (e.g., they are configured to operate through vacuum chamber windows). The present invention further enables such features while still being able to mount the alignment component 36 on the alignment plate 34 so they remain at the focal plane 44 for the energy beams 26A of the irradiation device 26, while allowing the alignment plate 34 to move rotationally with the build platform 16. This has provided a solution to the issue of providing an alignment plate/alignment component that move in this way without requiring an "elevator mechanism" on the turntable and inside the hot environment.

Figure 2:
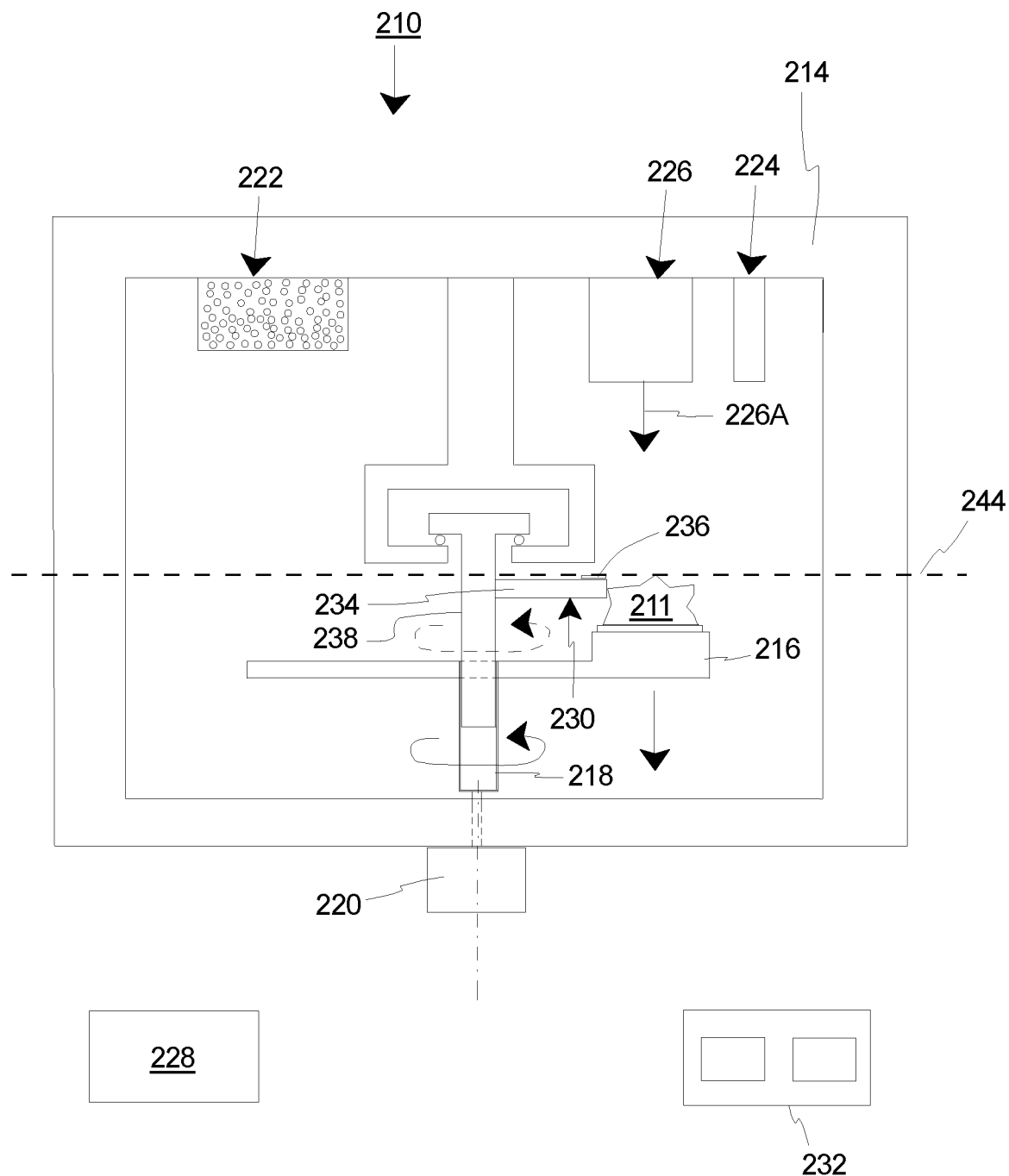
FIG. 2 is a simplified cut-away view of another embodiment of the processing machine.

FIG. 2 is a simplified cut-away view of another embodiment of the processing machine 210. As illustrated, the processing machine 210 is substantially similar to the embodiment illustrated and described above in relation to FIG. 1. For example, the processing machine 210 again includes a build chamber 214, a build platform 216, a platform support structure 218, a platform mover assembly 220, a material supply 222, a measurement device 224, an irradiation device 226, a chamber environmental controller 228, an analyzer system 230, and a control system 232 that are substantially similar to what has been illustrated and described herein above.

However, in this embodiment, the alignment plate 234 of the analyzer system 230, with the alignment component 236 formed thereon and/or coupled thereto, has been repositioned relative to the build platform 216 such that the alignment plate 234 and alignment component 236 are much closer to the build area 216B upon which the object 211 is being formed. It is appreciated that in this position, with the features of the present invention, the alignment component 236 is still maintained at the focal plane 244 of the energy beam 226A of the irradiation device 226. Additionally, as with the previous embodiments, the plate support structure 238 (and thus the alignment plate 234 with the alignment component 236 thereon) is still constrained to rotate with the platform support structure 218, while allowing relative, e.g., vertical, movement between the platform support structure 218 (and thus the build platform 216) and the plate support structure 238 (and thus the alignment plate 234 and alignment component 236). Thus, with such design, the present invention is again able to effectively monitor that the energy beam 226A from the irradiation device 226 is properly focused such that the processing machine 210 can manufacture the object 211 to the desired specifications.

Figure 3:
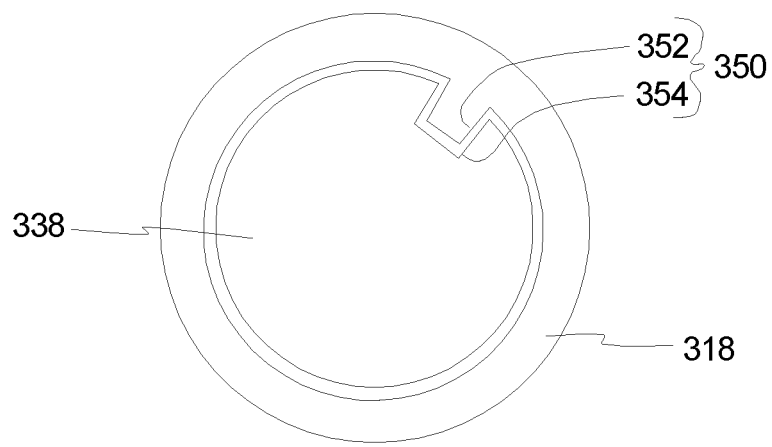
FIG. 3 is a simplified cut-away view of a portion of an embodiment of a platform support structure and a plate support structure that are usable as part of the processing machine.

FIG. 3 is a simplified cut-away view of a portion of an embodiment of the platform support structure 318 and the plate support structure 338 that are usable as part of the processing machine 10 (illustrated in FIG. 1). More particularly, FIG. 3 is a simplified cut-away view that illustrates an embodiment of the coupling system 350 that constrains the plate support structure 338 and the platform support structure 318 to rotate together, but which also allows relative movement between the plate support structure 338 and the platform support structure 318 along a length of the structures 318, 338, i.e. in the vertical direction as shown, for example, in FIG. 1. As illustrated, at least a portion of the platform support structure 318 is configured to substantially encircle and/or surround at least a portion of the plate support structure 338. It is appreciated that in certain alternative embodiments, at least a portion of the plate support structure 338 can be configured to substantially encircle and/or surround at least a portion of the platform support structure 318.

As shown in FIG. 3, the platform support structure 318 includes a first coupling feature 352, and the plate support structure 338 includes a second coupling feature 354, which are configured to be coupled to one another, and which together form the coupling system 350 that constrains the plate support structure 338 and the platform support structure 318 to rotate together, but which also allows relative movement between the plate support structure 338 and the platform support structure 318 along the length of the structures 318, 338.

It is appreciated that the first coupling feature 352 and the second coupling feature 354 can have any suitable design that constrains the plate support structure 338 and the platform support structure 318 to rotate together, but which also allows relative movement between the plate support structure 338 and the platform support structure 318 along the length of the structures 318, 338. In various embodiments, each of the first coupling feature 352 and the second coupling feature 354 can incorporate some manner of a non-circular design for the platform support structure 318 and the plate support structure 338, respectively.

In the embodiment illustrated in FIG. 3, the platform support structure 318 can be a substantially annular-shaped structure, but which further includes the first coupling feature 352 in the form of a key which extends in a generally inward radial direction. Additionally, the plate support structure 338 can be a substantially cylindrical-shaped structure, but which includes the second coupling feature 354 in the form of a keyway slot which extends in a generally inward radial direction, and which corresponds with the key of the first coupling feature 352 of the platform support structure 318. With such design, as the platform mover assembly 20 (illustrated in FIG. 1) rotates the platform support structure 318 (and thus the build platform 16 (illustrated in FIG. 1) and/or the build area 16B (illustrated in FIG. 1)) about the first platform movement axis 48X (illustrated in FIG. 1), the first coupling feature 352 of the platform support structure 318 will engage the second coupling feature 354 of the plate support structure 338 to cause the plate support structure 338 (and thus the alignment plate 34 (illustrated in FIG. 1) with the alignment component 36 (illustrated in FIG. 1) formed thereon and/or coupled thereto) to rotate about the platform movement axis 48X concurrently with the platform support structure 318. However, when the platform mover assembly 20 moves the platform support structure 318 (and thus the build platform 16 and/or the build area 16B) along the platform movement axis 48X, e.g., downward vertically, during the manufacturing of an object 11 (illustrated in FIG. 1), the plate support structure 338 (and thus the alignment plate 34 with the alignment component 36 formed thereon and/or coupled thereto) will remain in the same vertical position (allowing relative motion between the support structures 318, 338 along the length of the structures 318, 338 and/or along the platform movement axis 48X) so that the alignment component 36 is still in the focal plane 44 (illustrated in FIG. 1) of the energy beam 26A (illustrated in FIG. 1) from the irradiation device 26 (illustrated in FIG. 1). In this manner, the energy beam 26A can be consistently focused as desired so that the object 11 can be properly built to desired specifications. Alternatively, in other embodiments, the first coupling feature 352 and the second coupling feature 354 can have other suitable designs that still cause the support structures 318, 338 to rotate together, but which allow relative vertical movement between the structures 318, 338.

Figure 4:
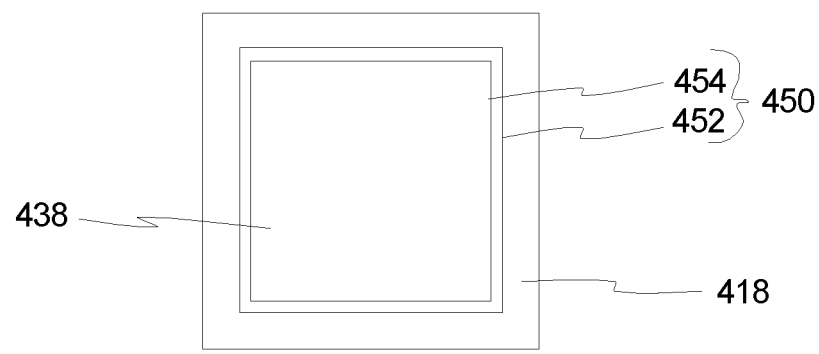
FIG. 4 is a simplified cut-away view of a portion of another embodiment of the platform support structure and the plate support structure.

FIG. 4 is a simplified cut-away view of a portion of another embodiment of the platform support structure 418 and the plate support structure 438 that are usable as part of the processing machine 10 (illustrated in FIG. 1). More particularly, FIG. 4 is a simplified cut-away view that illustrates another embodiment of the coupling system 450 that constrains the plate support structure 438 and the platform support structure 418 to rotate concurrently, but which also allows relative movement between the plate support structure 438 and the platform support structure 418 along a length of the structures 418, 438, i.e. in the vertical direction as shown, for example, in FIG. 1. As illustrated, at least a portion of the platform support structure 418 is configured to substantially encircle and/or surround at least a portion of the plate support structure 438. It is appreciated that in certain alternative embodiments, at least a portion of the plate support structure 438 can be configured to substantially encircle and/or surround at least a portion of the platform support structure 418.

As shown in FIG. 4, the platform support structure 418 includes a first coupling feature 452, and the plate support structure 438 includes a second coupling feature 454, which are configured to be coupled to one another, and which together form the coupling system 450 that constrains the plate support structure 438 and the platform support structure 418 to rotate concurrently about the platform movement axis 48X (illustrated in FIG. 1), but which also allows relative movement between the plate support structure 438 and the platform support structure 418 along the length of the structures 418, 438.

In the embodiment illustrated in FIG. 4, the platform support structure 418 can be a substantially annular-shaped structure, but which further includes the first coupling feature 452 in the form of a rectangular inner surface. Additionally, the plate support structure 438 can be a substantially rectangular-shaped structure, which includes the second coupling feature 454 in the form of a rectangular outer surface, which corresponds with the rectangular inner surface of the first coupling feature 452 of the platform support structure 418. With such design, as the platform mover assembly 20 (illustrated in FIG. 1) rotates the platform support structure 418 (and thus the build platform 16 (illustrated in FIG. 1) and/or the build area 16B (illustrated in FIG. 1) about the platform movement axis 48X, the first coupling feature 452 of the platform support structure 418 will engage the second coupling feature 454 of the plate support structure 438 to cause the plate support structure 438 (and thus the alignment plate 34 (illustrated in FIG. 1) with the alignment component 36 (illustrated in FIG. 1) formed thereon and/or coupled thereto) to rotate about the platform movement axis 48X concurrently with the platform support structure 418. However, when the platform mover assembly 20 moves the platform support structure 418 (and thus the build platform 16 and/or the build area 16B) along the platform movement axis 48X, e.g., downward vertically, during the manufacturing of an object 11 (illustrated in FIG. 1), the plate support structure 438 (and thus the alignment plate 34 with the alignment component 36 formed thereon and/or coupled thereto) will remain in the same vertical position (allowing relative motion between the support structures 418, 438 along the length of the structures 418, 438 and/or along the platform movement axis 48X) so that the alignment component 36 is still in the focal plane 44 (illustrated in FIG. 1) of the energy beam 26A (illustrated in FIG. 1) from the irradiation device 26 (illustrated in FIG. 1). In this manner, the energy beam 26A can be consistently focused as desired so that the object 11 can be properly built to desired specifications.

Figure 5:
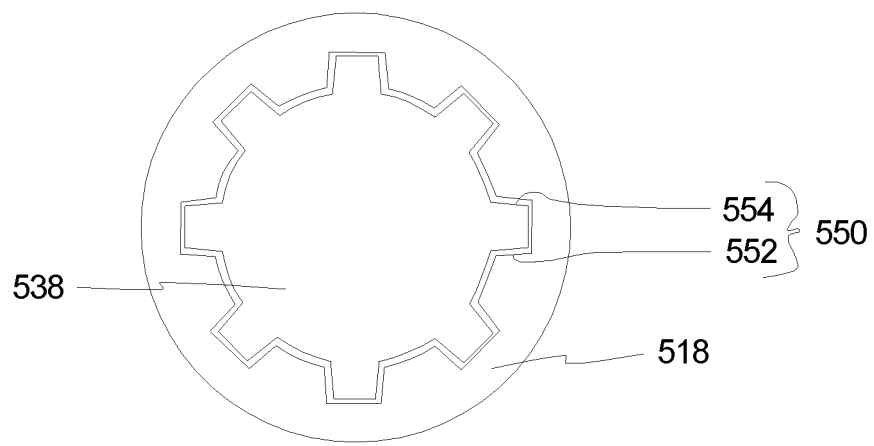
FIG. 5 is a simplified cut-away view of a portion of still another embodiment of the platform support structure and the plate support structure.

FIG. 5 is a simplified cut-away view of a portion of still another embodiment of the platform support structure 518 and the plate support structure 538 that are usable as part of the processing machine 10 (illustrated in FIG. 1). More particularly, FIG. 5 is a simplified cut-away view that illustrates another embodiment of the coupling system 550 that constrains the plate support structure 538 and the platform support structure 518 to rotate concurrently, but which also allows relative movement between the plate support structure 538 and the platform support structure 518 along a length of the structures 518, 538, i.e. in the vertical direction as shown, for example, in FIG. 1. As illustrated, at least a portion of the platform support structure 518 is configured to substantially encircle and/or surround at least a portion of the plate support structure 538. It is appreciated that in certain alternative embodiments, at least a portion of the plate support structure 538 can be configured to substantially encircle and/or surround at least a portion of the platform support structure 518.

As shown in FIG. 5, the platform support structure 518 includes a first coupling feature 552, and the plate support structure 538 includes a second coupling feature 554, which are configured to be coupled to one another, and which together form the coupling system 550 that constrains the plate support structure 538 and the platform support structure 518 to rotate together, but which also allows relative movement between the plate support structure 538 and the platform support structure 518 along the length of the structures 518, 538.

In the embodiment illustrated in FIG. 5, the platform support structure 518 can be a substantially annular-shaped structure, but which further includes the first coupling feature 552 in the form of a spline-shaped inner surface. Additionally, the plate support structure 538 can be a substantially spline-shaped structure, which includes the second coupling feature 554 in the form of a spline-shaped outer surface, which corresponds with the spline-shaped inner surface of the first coupling feature 552 of the platform support structure 518. With such design, as the platform mover assembly 20 (illustrated in FIG. 1) rotates the platform support structure 518 (and thus the build platform 16 (illustrated in FIG. 1) and/or the build area 16B (illustrated in FIG. 1)) about the platform movement axis 48X (illustrated in FIG. 1), the first coupling feature 552 of the platform support structure 518 will engage the second coupling feature 554 of the plate support structure 538 to cause the plate support structure 538 (and thus the alignment plate 34 (illustrated in FIG. 1) with the alignment component 36 (illustrated in FIG. 1) formed thereon and/or coupled thereto) to rotate about the platform movement axis 48X concurrently with the platform support structure 518. However, when the platform mover assembly 20 moves the platform support structure 518 (and thus the build platform 16 and/or the build area 16B) along the second-platform movement axis 48X, e.g., downward vertically, during the manufacturing of an object 11 (illustrated in FIG. 1), the plate support structure 538 (and thus the alignment plate 34 with the alignment component 36 formed thereon and/or coupled thereto) will remain in the same vertical position (allowing relative motion between the support structures 518, 538 along the length of the structures 518, 538 and/or along the platform movement axis 48X) so that the alignment component 36 is still in the focal plane 44 (illustrated in FIG. 1) of the energy beam 26A (illustrated in FIG. 1) from the irradiation device 26 (illustrated in FIG. 1). In this manner, the energy beam 26A can be consistently focused as desired so that the object 11 can be properly built to desired specifications.

Figure 6:
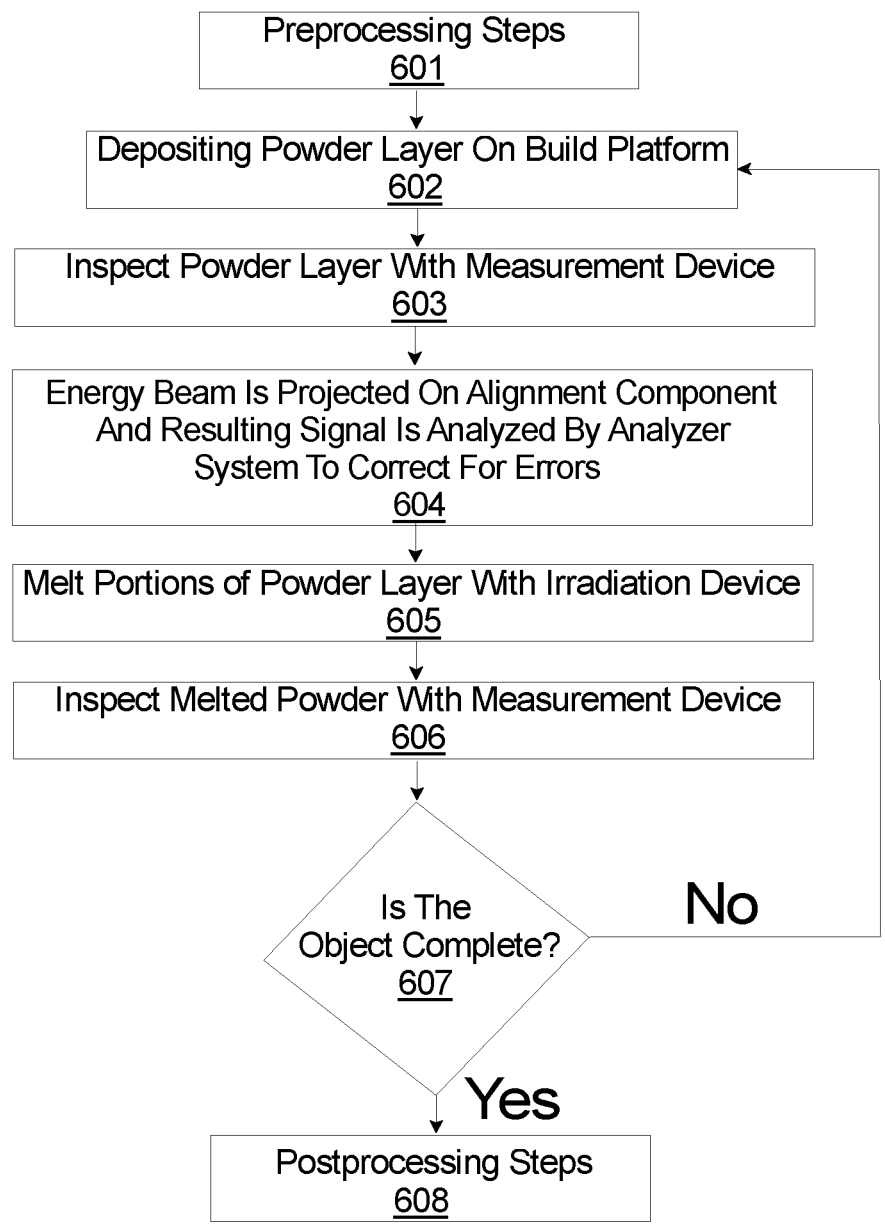
FIG. 6 is a simplified flowchart that illustrates one representative method for making an object with the processing machine.

FIG. 6 is a simplified flowchart that illustrates one, non-exclusive method for making one or more built objects with the processing machine of the present invention. At step 601, preprocessing steps are performed in the build chamber. Next, at step 602, a powder layer is deposited onto the build platform, the build area and/or the build frame using the material supply. Subsequently, at step 603, the measurement device can be used to inspect/measure the characteristics of the powder layer. At step 604, the energy beam is projected on the alignment component and the resulting signal (e.g., backscattered electrons or reflected light) are analyzed by the analyzer system to correct for drift, misalignment, or other errors. Next, at step 605, a portion of the powder layer is melted with the irradiation device. The control system controls the irradiation device to properly focus the energy beam from the irradiation device, based on feedback from the analyzer system obtained in step 604, to precisely irradiate the powder layer. Next, at step 606 the measurement device can be used to inspect/measure the characteristics of the melted powder. Subsequently, at step 607, the control system can determine if the built object is complete. If the object is not complete, steps 602-607 can be repeated until the object is complete.

After the object is complete, at step 608, the object can be retained within the build chamber or can be moved to another suitable location for controlled post-processing. At this time, if the object is retained within the build chamber, the chamber environmental controller can be used to maintain and provide the desired environment for post-processing of the built object. In alternative, non-exclusive examples, the cool down time can be at least two, four, six, eight, ten or twelve hours.

It is understood that although a number of different embodiments of the processing machine have been illustrated and described herein, one or more features of any one embodiment can be combined with one or more features of one or more of the other embodiments, provided that such combination satisfies the intent of the present invention.

While a number of exemplary aspects and embodiments of the processing machine have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A processing machine for building an object from a material, the processing machine comprising:
   a build platform;
   a platform mover assembly that is configured to move the build platform about a platform movement axis;
   a material supply that supplies material to build the object on the build platform;
   an irradiation device which irradiates at least a portion of the material with an energy beam to form the object from the material on the build platform; and
   an analyzer system that is configured to monitor the energy beam, the analyzer system including an alignment component;
   wherein the platform mover assembly changes a spacing between the build platform and the irradiation device along the platform movement axis, and
   wherein a first spacing between the build platform and the irradiation device along the platform movement axis is larger than a second spacing between the alignment component and the irradiation device along the platform movement axis when the platform mover assembly changes the spacing between the build platform and the irradiation device.

2. The processing machine of claim 1 further comprising a platform support structure that supports the build platform; and wherein the platform mover assembly is coupled to the platform support structure and moves the platform support structure about the platform movement axis and along the platform movement axis.

3. The processing machine of claim 1 further comprising a measurement device that measures the object as it is being built on the build platform.

4. The processing machine of claim 1 further comprising a control system that is configured to control operation of the platform mover assembly, the material supply, the irradiation device, and the analyzer system.

5. The processing machine of claim 1 further comprising a build chamber that defines a build space; and wherein the build platform is enclosed within the build chamber.

6. The processing machine of claim 5 wherein the alignment component is supported by a support bearing that is coupled to the build chamber to inhibit the alignment component from moving along the platform movement axis with the build platform.

7. The processing machine of claim 6 wherein the analyzer system further includes a support frame that is coupled to the build chamber; and wherein the support bearing is attached to the support frame.

8. The processing machine of claim 7 wherein the analyzer system further includes an alignment plate; and wherein the alignment component is formed onto the alignment plate.

9. The processing machine of claim 8 wherein the analyzer system further includes a plate support structure that supports the alignment plate.

10. The processing machine of claim 9 further comprising a platform support structure that supports the build platform; wherein the platform mover assembly is coupled to the platform support structure and moves the platform support structure about the platform movement axis and along the platform movement axis; and wherein the platform support structure is configured to be coupled to the plate support structure so that the plate support structure rotates concurrently with the platform support structure about the platform movement axis, and the platform support structure moves along the platform movement axis relative to the plate support structure.

11. The processing machine of claim 10 wherein at least a portion of the platform support structure is configured to substantially encircle at least a portion of the plate support structure.

12. The processing machine of claim 10 wherein at least a portion of the plate support structure is configured to substantially encircle at least a portion of the platform support structure.

13. The processing machine of claim 10 wherein the analyzer system further includes a coupling system that couples the platform support structure and the plate support structure.

14. The processing machine of claim 13 wherein the coupling system includes a first coupling feature that is formed into the platform support structure, and a second coupling feature that is formed into the plate support structure; and wherein the first coupling feature is configured to be coupled to the second coupling feature so that the platform support structure and the plate support structure rotate together about the platform movement axis.

15. The processing machine of claim 14 wherein the first coupling feature is a first non-circular feature that is formed onto a surface of the platform support structure; and wherein the second coupling feature is a second non-circular feature that corresponds with the first non-circular feature.

16. The processing machine of claim 15 wherein each of the first coupling feature includes a key and the second coupling feature includes a keyway slot.

17. The processing machine of claim 15 wherein each of the first coupling feature and the second coupling feature includes a rectangular-shaped surface.

18. The processing machine of claim 15 wherein each of the first coupling feature and the second coupling feature includes a spline-shaped surface.

19. The processing machine of claim 10 wherein the coupling between the platform support structure and the plate support structure allows relative movement between the platform structure and the plate support structure along a length of the support structures.

20. A processing machine for building an object from a material, the processing machine comprising:
- a build platform;
- a platform support structure that supports the build platform;
- a platform mover assembly that is configured to move the platform support structure about a platform movement axis and along the platform movement axis;
- a material supply that supplies material to build the object on the build platform;
- an irradiation device which irradiates at least a portion of the material with an energy beam to form the object from the material on the build platform; and
- an analyzer system that is configured to monitor the energy beam, the analyzer system including a plate support structure that is configured to be coupled to the platform support structure such that the plate support structure is constrained to rotate concurrently with the platform support structure about the platform movement axis, but so as to allow relative movement between the platform support structure and the plate support structure along the platform movement axis.

21. The processing machine of claim 20 further comprising a measurement device that measures the object as it is being built on the build platform.

22. The processing machine of claim 20 further comprising a control system that is configured to control operation of the platform mover assembly, the material supply, the irradiation device, and the analyzer system.

23. The processing machine of claim 20 further comprising a build chamber that defines a build space; and wherein the build platform is enclosed within the build chamber.

24. The processing machine of claim 23 wherein the analyzer system further includes an alignment plate that is supported by the plate support structure, and an alignment component that is formed onto the alignment plate.

25. The processing machine of claim 24 wherein the alignment plate is supported by a support bearing that is coupled to the build chamber to inhibit the alignment component from moving along the platform movement axis with the build platform.

26. The processing machine of claim 25 wherein the analyzer system further includes a support frame that is coupled to the build chamber; and wherein the support bearing is attached to the support frame.

27. The processing machine of claim 20 wherein at least a portion of the platform support structure is configured to substantially encircle at least a portion of the plate support structure.

28. The processing machine of claim 20 wherein at least a portion of the plate support structure is configured to substantially encircle at least a portion of the platform support structure.

29. The processing machine of claim 28 wherein the analyzer system further includes a coupling system that couples the platform support structure and the plate support structure.

30. The processing machine of claim 29 wherein the coupling system includes a first coupling feature that is formed into the platform support structure, and a second coupling feature that is formed into the plate support structure; and wherein the first coupling feature is configured to be coupled to the second coupling feature so that the platform support structure and the plate support structure rotate concurrently about the platform movement axis.

31. The processing machine of claim 30 wherein the first coupling feature is a first non-circular feature that is formed onto a surface of the platform support structure; and wherein the second coupling feature is a second non-circular feature that corresponds with the first non-circular feature.

32. The processing machine of claim 31 wherein each of the first coupling feature includes a key and the second coupling feature includes a keyway slot.

33. The processing machine of claim 31 wherein each of the first coupling feature and the second coupling feature includes a rectangular-shaped surface.

34. The processing machine of claim 31 wherein each of the first coupling feature and the second coupling feature includes a spline-shaped surface.

* * * * *